(12) United States Patent
Szöke et al.

(10) Patent No.: US 6,701,209 B2
(45) Date of Patent: Mar. 2, 2004

(54) SYSTEM AND METHOD FOR ASCERTAINING THE OPTIMUM OPERATING SPEED OF A PRODUCTION MACHINE

(75) Inventors: Szaniszlo Szöke, Gesves (BE); Gerhard Vollmar, Meckenheim (DE)

(73) Assignee: ABB Research LTD, Zurich (CH)

( * ) Notice: Subject to any disclaimer, the term of this patent is extended or adjusted under 35 U.S.C. 154(b) by 0 days.

(21) Appl. No.: 10/252,321

(22) Filed: Sep. 23, 2002

(65) Prior Publication Data

US 2003/0060904 A1 Mar. 27, 2003

Related U.S. Application Data

(63) Continuation of application No. PCT/EP00/02470, filed on Mar. 21, 2000.

(51) Int. Cl.[7] .............................................. G06F 19/00
(52) U.S. Cl. ..................................... 700/173; 700/108
(58) Field of Search ....................... 705/8; 700/96–97, 700/100–102, 173, 108

(56) References Cited

U.S. PATENT DOCUMENTS

| | | | |
|---|---|---|---|
| 5,027,293 A | * | 6/1991 | Pung et al. ................ 702/185 |
| 5,280,425 A | | 1/1994 | Hogge |
| 5,291,394 A | * | 3/1994 | Chapman ...................... 705/8 |
| 5,305,221 A | | 4/1994 | Atherton |
| 5,402,367 A | | 3/1995 | Sullivan et al. |
| 5,721,686 A | | 2/1998 | Shahraray et al. |
| 6,144,893 A | * | 11/2000 | Van Der Vegt et al. ..... 700/108 |
| 6,157,916 A | * | 12/2000 | Hoffman ........................ 705/8 |

FOREIGN PATENT DOCUMENTS

| | | |
|---|---|---|
| DE | 41 10 108 A1 | 12/1991 |
| DE | 197 40 307 A1 | 3/1999 |
| JP | 07282144 | 10/1995 |
| JP | 09305204 | 11/1997 |
| WO | 96/28773 | 9/1996 |

OTHER PUBLICATIONS

Muller, D.J. et al: "A Simulation–Based Work Order Release Mechanism for a Flexible Manufacturing System", IEEE, pp. 599–602.

* cited by examiner

*Primary Examiner*—Leo Picard
*Assistant Examiner*—Alexander Kosowski
(74) *Attorney, Agent, or Firm*—Laurence A. Greenberg; Werner H. Stemer; Ralph E. Locher

(57) ABSTRACT

A system and a method ascertain the optimum operating speed of a production machine that is configured to operate in a specific speed range. The production machine is assigned a data acquisition device that acquires production data, in particular time and duration of machine downtimes caused by fault events, and also production unit numbers per unit time. A data processing device acquires additional information, by using a data input device, in particular the respective reason for a failure, and also the description of the product to be processed in each case. Using a production-data acquisition device, production data can be called up from the data acquisition device and linked with the additional information from the data input device. An assessment function ascertains an operating speed from the production data and a stored assessment model. An optimization function forms an optimum operating speed desired value by linking the ascertained operating speed with production unit costs.

12 Claims, 6 Drawing Sheets

| Start time | Duration | Fault event |
|---|---|---|
| 25/01/2000 10:15:12 | 00:05:30 | Motor overheating |
| 25/01/2000 10:40:42 | 00:03:00 | Empty pack |
| 25/01/2000 11:15:12 | 00:04:30 | Motor overheating |
| 25/01/2000 12:25:10 | 00:05:00 | Oil pump off. |
| 25/01/2000 14:15:00 | 00:06:15 | Motor off. |
| 25/01/2000 15:11:12 | 00:05:10 | Poor material |
| 25/01/2000 17:05:11 | 00:10:00 | Maintenance |

Fig. 3

| Start time | Duration | Product |
|---|---|---|
| 25/01/2000 10:00:00 | 01:30:00 | Product A |
| 25/01/2000 11:30:00 | 02:00:00 | Product B |
| 25/01/2000 13:30:00 | 04:00:00 | Product C |

| Start time | Quantity |
|---|---|
| 25/01/2000 10:15:00 | 1002 |
| 25/01/2000 10:20:00 | 2576 |
| 25/01/2000 10:25:00 | 2639 |
| 25/01/2000 10:30:00 | 2498 |
| 25/01/2000 10:35:00 | 2530 |
| 25/01/2000 10:40:00 | 970 |
| 25/01/2000 10:45:00 | 2500 |

Fig. 4

Case 1: Machine producing normally

Costs$_1$ = Fixed machine costs + variable machine costs + raw material costs + packaging material costs Case 2: Machine recycling raw material Costs$_2$ = Fixed machine costs + variable machine costs + packaging material costs Case 3: Machine stopped Costs$_3$ = Fixed machine costs $$\text{Unit costs} = \frac{1}{n \text{ units}} \sum costs_i * \Delta T_i$$

Fig. 5

SYSTEM AND METHOD FOR ASCERTAINING THE OPTIMUM OPERATING SPEED OF A PRODUCTION MACHINE

CROSS-REFERENCE TO RELATED APPLICATION

This application is a continuation of copending International Application No. PCT/EP00/02470, filed Mar. 21, 2000, which designated the United States and was not published in English.

BACKGROUND OF THE INVENTION

Field of the Invention

The invention relates to a method for ascertaining the optimum operating speed of a production machine that can operate in a specific speed range, and to a system for implementing such a method.

In many branches of industry, machines are used that can operate at more than one speed. Examples of this are a packaging machine that can fill 30 to 50 packs per minute, for example, an extruder that can process a mass of 1200 to 1500 kg per hour, or a printer that can move and print 200 to 400 meters of paper strip per minute.

The desired speed to be predefined for the machine operation in each case is generally taken by the machine operator from operating instructions of the machine manufacturer.

However, the desired speed ascertained in this way does not necessarily have to be the optimum speed: neither with regard to production quantities per unit time, nor with regard to production costs. This is explained by the fact that machine manufacturers often specify an excessively high machine speed for competitive reasons. In addition, the machine manufacturer cannot take account of particular production-related circumstances when specifying their speed. For example, a machine may possibly be able to fill 50 packs per minute with dry, fine-grain coffee without difficulty, but when filling more than 30 packs per minute with moist, finely ground coffee, can often cause downtime.

SUMMARY OF THE INVENTION

It is accordingly an object of the invention to provide a system and a method for ascertaining the optimum operating speed of a production machine that overcome the hereinafore-mentioned disadvantages of the heretofore-known devices of this general type and that automatically optimize the desired speed of a production machine.

With the foregoing and other objects in view, there is provided, in accordance with the invention, a system for ascertaining an optimum operating speed of a production machine set to operate in a specific speed range. The system includes a data acquisition device assigned to a production machine, and a data processing device. The data acquisition device is set to acquire production data. The production machine is assigned to the data acquisition device. The data processing device has a data input device for acquiring additional information. The data processing device contains a production-data acquisition device, links the production data from the data acquisition device with the additional information from the data input device to form product data, and stores the product data in a production database. The data processing device contains an assessment function that recalls the production data from the production database and a stored assessment model, to ascertain an operating speed and stores the operating speed in a data storage device. The data processing device contains an optimization function having access to data in the data storage device, and, by linking with production unit costs, ascertains an optimum operating speed desired value, and feeds the optimum operating speed desired value to a desired value storage device.

In accordance with a further object of the invention, the production data can include time of machine downtimes caused by fault events, duration of machine downtimes caused by fault events, and production unit numbers per unit time.

In accordance with a further object of the invention, the additional information can include a respective reason for a failure and, in each case, a description of a product to be processed.

With the objects of the invention in view, there is also provided a method for ascertaining an optimum operating speed of a production machine operatable in a specific speed range. The first step of the method is acquiring production data. The next step is acquiring additional information. The next step is forming production data by linking the production data and the additional information. The next step is storing the production data. The next step is ascertaining an optimum operating speed from the production data, an assessment model, and ascertained production unit costs.

With the objects of the invention in view, there is also provided a further system for ascertaining an optimum operating speed of a production machine operating in a specific speed range. The system includes a data acquisition device assigned to a production machine, a data input device, a data processing device, a production database, a data storage device, an assessment function, a desired value storage device, and an optimization function. The data acquisition device is assigned to the production machine and acquiring production data. The data processing device acquires additional information from the data input device. The data processing device contains a production-data acquisition device of the data processing device, links the production data from the data acquisition device with the additional information from the data input device to form product data, and stores the product data in the production database. The assessment function contained in the data processing device recalls the production data from the production database and a stored assessment model and ascertains an operating speed from the production data and the stored assessment model and stores it in a data storage device. The optimization function is contained in the data processing device. The optimization function has access to the data in the data storage device and ascertains an optimum operating speed desired value by linking the data in the data storage device with production unit costs, and feeds the optimum operating speed to the desired value storage device.

Other features that are considered as characteristic for the invention are set forth in the appended claims.

Although the invention is illustrated and described herein as embodied in a system and a method for ascertaining the optimum operating speed of a production machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the follow-

BRIEF DESCRIPTION OF THE DRAWINGS

FIG. 3 is a table showing fault event data;

FIG. 4 is a table showing product-related data;

FIG. 5 is an equation for determining unit costs in an assessment model; and

DESCRIPTION OF THE PREFERRED EMBODIMENTS

Figure 1:
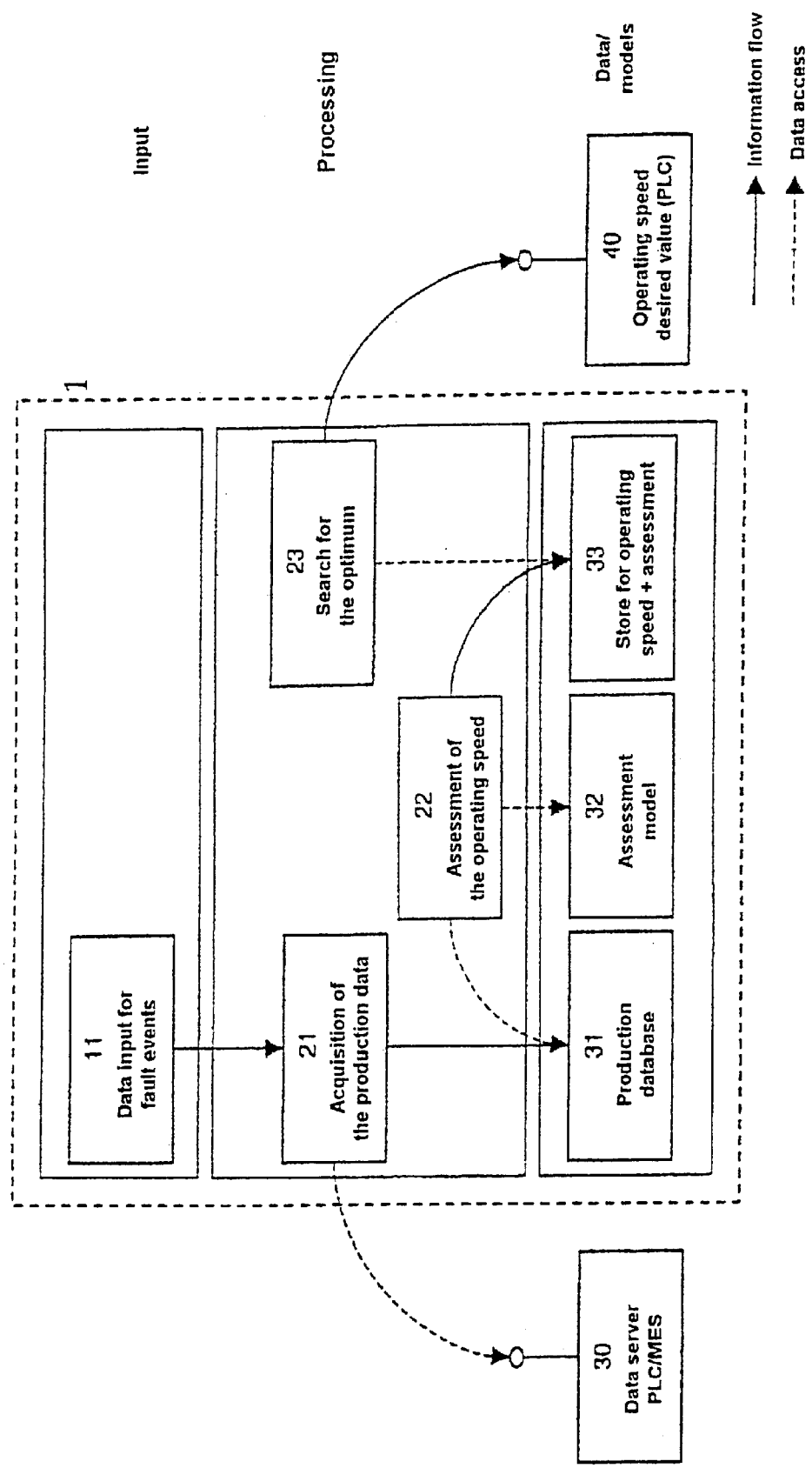
FIG. 1 is a block diagram showing a system for automatic optimization according to the invention.

Referring now to the figures of the drawings in detail and first, particularly to FIG. 1 thereof, there is shown a block diagram of a system for the automatic optimization of the operating speed of a production machine. The block diagram shows components belonging to a data processing device 1, which contains hardware and software components for data input, processing and storage. Production data can be recalled from a data acquisition device 30 and linked with additional information by using a production-data acquisition device 21. The data acquisition device 30 may be a data server in a programmable logic controller (PLC) or a manufacturing executing system (MES). Production data acquired automatically are, for example, machine status (e.g. running, switched off, waiting), production quantities or material consumption. Additional information is, for example, product description or information relating to the reason for switching off a machine, which may be input by a data input device 11. The data acquisition device 30 causes the storage of production data formed in this way in a production database 31.

The data processing device 1 contains an assessment function 22, which is set up to call up production data from the production database 31, and also a stored assessment model 32, to ascertain an operating speed on this basis and to store it in a data storage device 33.

In addition, the data processing device 1 contains an optimization function 23, which has access to data in the data storage device 33, and, by linking with production costs, ascertains an optimum operating speed desired value, which it feeds to a desired value storage device 40.

The way in which the system operates will be explained further in the following text using the method steps illustrated in FIG. 2.

Figure 2:
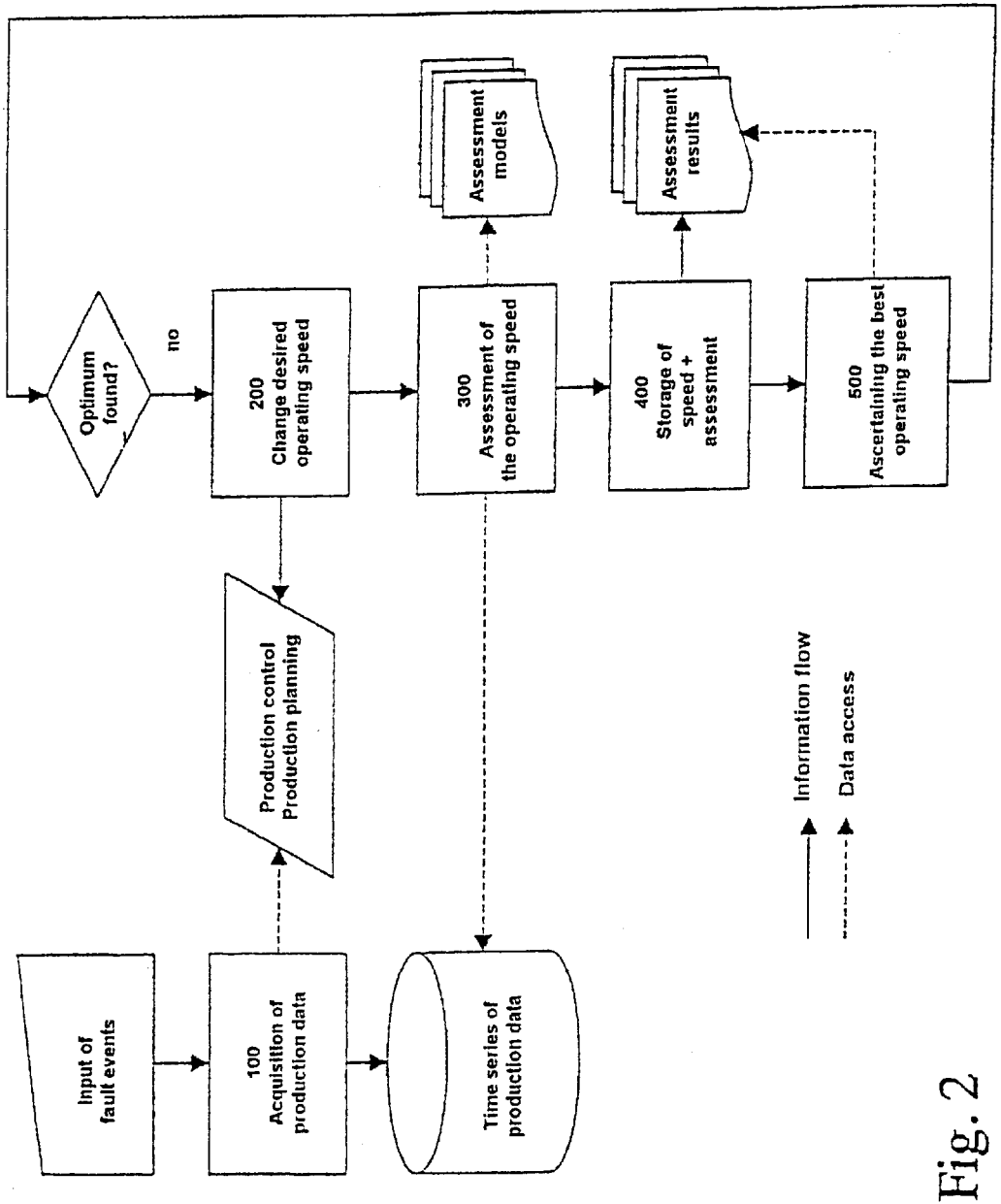
FIG. 2 is a flowchart showing a method for automatic optimization.

FIG. 2 shows a step 100 in which, the information needed for the optimization is acquired from the production-data acquisition device 21 and stored as time series in the production database 31. The acquired data include the following: downtimes as a result of fault events (FIG. 3 shows such fault event data by way of example); the quantities produced for each type of product; and the production time duration for each type of product (in this regard, see also FIG. 4).

In step 200, a desired value for the operating speed is predefined via an interface to the desired value storage device 40 of the production control system. Optimization steps are then carried out.

In step 300, the currently set operating speed is assessed by applying the assessment function 22. To this end, access is made to production data stored in the production database 31. Typically, such an evaluation will be carried out for one day or one week. The operating speed is assessed by the assessment model 32, which is illustrated by way of example in FIG. 5.

In step 400, the respective ascertained speed is stored in a data storage device 33 together with the result of the assessment. Because the optimum machine speed may also depend on the type of product, speed and assessment are stored in a product-related manner.

In step 500, the optimum of the operating speed is ascertained by an optimization function 23 on the basis of determined or predefined production unit costs.

Figure 6:
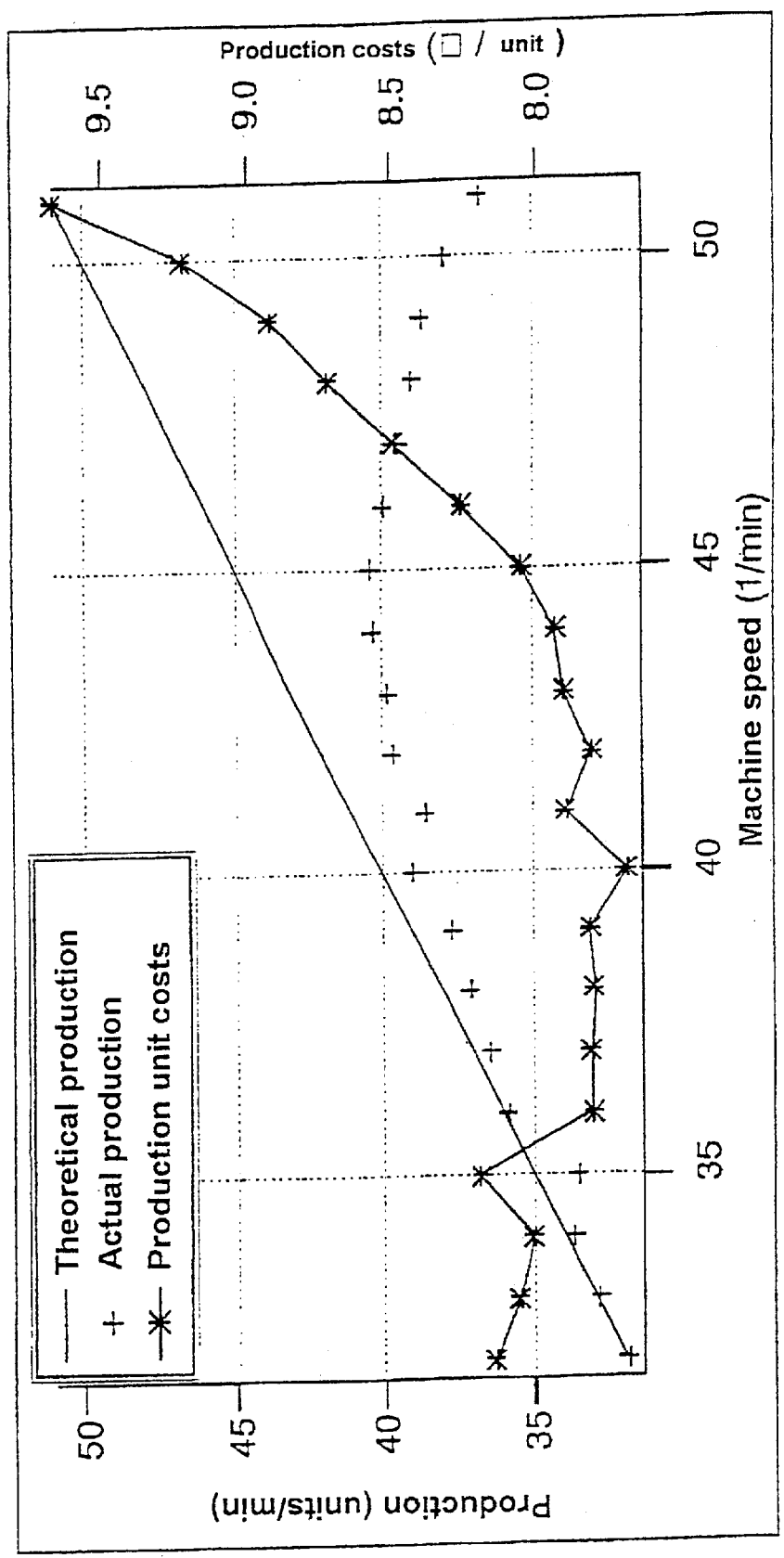
FIG. 6 is a graph comparing production unit costs versus production quantities (i.e. machine speed).

FIG. 6 shows, by way of example, profiles used for the optimization. In the example, the optimum lies at an operating speed of 40 l/min. If the optimum has not yet been found, the speed is varied in a predefined step width, and a repeated step 200 predefines the new desired value to the machine control system. The optimization can be performed with a scatter plot smoothing algorithm, which is described, for example, in Venables, *Ripley: Modern Applied Statistics with S-Plus*, Springer, 3rd Edition 1999.

FIG. 3 shows, by way of example, fault event data; in each case, start time, duration, and fault event are listed. The fault event data can either be derived automatically from the production-data acquisition 21, or the machine operator inputs the data via the data input device 11. The fault event data are needed for the assessment of the current production state, for example normal production, raw material is being recycled, or downtime.

FIG. 4 shows the form in which the product-related data are acquired. The quantity produced is acquired in defined time steps, for example every 5 minutes. In addition, the time and the duration at and during which a specific product was produced are recorded. It is therefore possible for product-related optimization of the machine speed to be performed.

FIG. 5 shows, by way of example, an assessment model. The assessment is performed by using the product unit costs. In the example, three cases are distinguished: normal production, the product raw material is being recycled, and the machine is stopped. The costs may be composed of the following:

fixed costs, for example machine depreciation;

variable costs, for example costs for drive power or costs for the machine operator;

costs for the raw material; and costs for the packaging material.

The production unit costs are given by the sum of the individual costs divided by the number relating to the quantity produced.

FIG. 6 shows the theoretical and actual dependence of the production capacity of a machine on the speed. A production quantity, which actually decreases as the speed increases, results from the increasing susceptibility to faults. FIG. 6 additionally shows an example of the profile of the assessment function from FIG. 5. It can clearly be seen that the production unit costs are minimal at an optimum speed.

We claim:

1. A system for ascertaining an optimum operating speed of a production machine set to operate in a specific speed range, the system comprising:

a data acquisition device assigned to the production machine and acquiring production data including time and duration of machine downtimes caused by fault events from the production machine;

a data processing device having a data input device acquiring additional information;

a production database;

said data processing device having a production-data acquisition device linking the production data from said data acquisition device with the additional information from said data input device to form product data and storing the product data in said production database;

an assessment model stored in said data processing device;

a data storage device;

said data processing device storing an assessment function, applying the production data from said production database to said stored assessment model to ascertain an operating speed, and storing the operating speed in said data storage device;

a desired value storage device; and said data processing device having an optimization function and linking the operating speed from the data storage device with production unit costs to ascertain an optimum operating speed desired value, and feeding the optimum operating speed desired value to said desired value storage device.

2. The system according to claim 1, wherein the production data include production unit numbers per unit time.

3. The system according to claim 1, wherein the additional information includes a respective reason for a failure.

4. The system according to claim 1, wherein the additional information includes, in each case, a description of a product to be processed.

5. A method for ascertaining an optimum operating speed of a production machine to be operated in a specific speed range, which comprises:

acquiring production data including time and duration of machine downtimes caused by fault events with a data acquisition device;

acquiring additional information with a data input device;

forming supplemented production data by linking the production data and the additional information with a production-data acquisition device;

storing the supplemented production data in a production database; and ascertaining an optimum operating speed from the supplemented production data, an assessment model, and ascertained production unit costs.

6. The method according to claim 5, wherein the production data include production unit numbers per unit time.

7. The method according to claim 5, wherein the additional information includes a reason for a failure.

8. The method according to claim 5, wherein the additional information includes a product description.

9. A system for optimizing a production-machine operating speed, comprising:

a data acquisition device assigned to a production machine and acquiring production data including time and duration of machine downtimes caused by fault events from the production machine;

a data input device connected to the production machine;

a data processing device acquiring additional information from said data input device;

a production database;

said data processing device containing a production-data acquisition device of said data processing device linking the production data from said data acquisition device with the additional information from the data input device to form supplemented product data and storing the supplemented product data in said production database;

a data storage device;

an assessment model stored in said data processing device;

an assessment function stored in said data processing device, recalling the production data from said production database, and ascertaining an operating speed from the supplemented production data and said assessment model, and storing the operating speed in said data storage device;

a desired value storage device; and an optimization function stored in said data processing device ascertaining an optimum operating speed desired value by linking the operating speed from said data storage device with production unit costs, and feeding the optimum operating speed to said desired value storage device.

10. The system according to claim 9, wherein the production data include production unit numbers per unit time.

11. The system according to claim 9, wherein the additional information includes a respective reason for a failure.

12. The system according to claim 9, wherein the additional information includes, in each case, a description of a product to be processed.

* * * * *